(12) United States Patent
Sprentall et al.

(10) Patent No.: US 9,573,226 B2
(45) Date of Patent: Feb. 21, 2017

(54) SYSTEM CONFIGURED FOR REMOVING A COATING FROM A SUBSTRATE USING ELECTROMAGNETIC RADIATION

(71) Applicant: AMERICAN LASER ENTERPRISES, LLC, Wixom, MI (US)

(72) Inventors: Donald E. Sprentall, South Lyon, MI (US); Keith A. Jefferies, New Hudson, MI (US)

(73) Assignee: SurClean, Inc., Wixom, MI (US)

( * ) Notice: Subject to any disclaimer, the term of this patent is extended or adjusted under 35 U.S.C. 154(b) by 137 days.

(21) Appl. No.: 14/352,831

(22) PCT Filed: Oct. 22, 2012

(86) PCT No.: PCT/US2012/061297
§ 371 (c)(1),
(2) Date: Apr. 18, 2014

(87) PCT Pub. No.: WO2013/059779
PCT Pub. Date: Apr. 25, 2013

(65) Prior Publication Data
US 2014/0305907 A1     Oct. 16, 2014

Related U.S. Application Data

(60) Provisional application No. 61/549,818, filed on Oct. 21, 2011.

(51) Int. Cl.
B23K 26/322     (2014.01)
B23K 26/36      (2014.01)
(Continued)

(52) U.S. Cl.
CPC .............. B23K 26/36 (2013.01); B08B 7/0035 (2013.01); B23K 26/03 (2013.01); B23K 26/362 (2013.01);
(Continued)

(58) Field of Classification Search
CPC . B23K 26/00; B23K 26/0006; B23K 26/0066; B23K 26/0625; B23K 26/322; B23K 26/32; B23K 26/324; B23K 26/36; B23K 26/40
(Continued)

(56) References Cited

U.S. PATENT DOCUMENTS 6,122,564 A       9/2000  Koch et al.
7,633,033 B2 *   12/2009  Thomas ................. B23K 26/03
                                                    219/121.62

(Continued)

FOREIGN PATENT DOCUMENTS

JP   2010-219141 A   9/2010
JP   2011-167768 A   9/2011
(Continued)

OTHER PUBLICATIONS

Office Action in corresponding Chinese application dated Mar. 2, 2015, 9 pages.
(Continued)

*Primary Examiner* — David Angwin
*Assistant Examiner* — Michael Laflame, Jr.
(74) *Attorney, Agent, or Firm* — Harness, Dickey & Pierce, P.L.C.

(57) ABSTRACT

A removal system is configured for removing a coating from a substrate of a component. A first and second energy source are each configured to direct electromagnetic radiation onto the component the electromagnetic radiation produces a respective first and second property. A sensor detects the first (Continued)

and second properties produced by the first and second stream of electromagnetic radiation. A controller is configured to receive the detected first and second property from the sensor and the associated first and second power levels from the respective first and second energy sources. The controller transmits an updated power level to at least one of the first and second energy sources in response to the first and second property received from the sensor and the associated power level received from the first and second energy sources.

7 Claims, 3 Drawing Sheets

(51) Int. Cl.
*B23K 26/40* (2014.01)
*B23K 26/03* (2006.01)
*B08B 7/00* (2006.01)

(52) U.S. Cl.
CPC ......... *B23K 26/40* (2013.01); *B23K 2203/172* (2015.10)

(58) Field of Classification Search
USPC .......................................... 219/121.6–121.86
See application file for complete search history.

(56) References Cited

U.S. PATENT DOCUMENTS

| 2003/0085203 | A1 | 5/2003 | Nair et al. |
| 2006/0000814 | A1 | 1/2006 | Gu et al. |
| 2010/0147812 | A1* | 6/2010 | Beck .................. B23K 26/0648 219/121.71 |
| 2010/0240155 | A1* | 9/2010 | Chang .................. B23K 26/032 438/16 |
| 2011/0180521 | A1 | 7/2011 | Quitter et al. |
| 2012/0091106 | A9 | 4/2012 | Beck et al. |

FOREIGN PATENT DOCUMENTS

| RU | 2 397 852 C2 | 8/2010 |
| WO | 01/76808 | 10/2001 |

OTHER PUBLICATIONS

Extended European Search Report in corresponding European application dated Dec. 10, 2015, 6 pages.

* cited by examiner

SYSTEM CONFIGURED FOR REMOVING A COATING FROM A SUBSTRATE USING ELECTROMAGNETIC RADIATION

CROSS-REFERENCE TO RELATED APPLICATIONS

This application claims the benefit of U.S. Provisional Patent Application No. 61/549,818 filed on Oct. 21, 2011, which is hereby incorporated by reference in its entirety.

TECHNICAL FIELD

The present disclosure relates to a system configured for removing a coating from a substrate using electromagnetic radiation.

BACKGROUND

Aircraft, vehicles, boats, and many other structures have surfaces which are primed, painted, or otherwise covered with coatings. Over time, the coatings may become dull, peel, or need to be removed such that another coating may be applied to the surfaces.

SUMMARY

A removal system is configured for removing a coating from a substrate of a component. A first energy source is configured to be energized at a first power level to direct a first stream electromagnetic radiation onto the component such that the first stream of electromagnetic radiation produces a first property on the component. A second energy source configured to be energized at a second power level to direct a second stream of electromagnetic radiation onto the component such that the second stream of electromagnetic radiation produces a second property on the component. A sensor is configured for detecting the first and second properties produced by the first and second stream of electromagnetic radiation. A controller is operatively connected to the first and second energy sources and the sensor. The controller is configured to receive the detected first and second properties from the sensor and the associated first and second power levels from the respective first and second energy sources. The controller is configured for transmitting an updated first and second power level to at least one of the first and second energy sources in response to the first and second properties received from the sensor and the associated power level received from the first and second energy sources.

A method of removing a coating from a substrate includes directing a first stream of electromagnetic radiation onto the component from a first energy source. The first energy source is energized at a first power level such that the first stream of electromagnetic radiation causes a first property to be produced on the component. A second stream of electromagnetic radiation is directed onto the component from a second energy source at a second power level such that the second stream of electromagnetic radiation causes a second property to be produced on the component. The second energy source is energized at a second power level such that the second stream of electromagnetic radiation causes a second property to be produced on the component. The first property of the component and the associated first power level of the first energy source are detected. The second property of the component and the associated second power level of the second energy source are detected. At least one of the detected first and second properties and the associated first and second power levels are transmitted to a controller. A determination is made, in the controller whether the coating is disposed on the substrate of the component, based on the detected first and second property. An updated power level is transmitted to at least one of the first and second energy sources.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
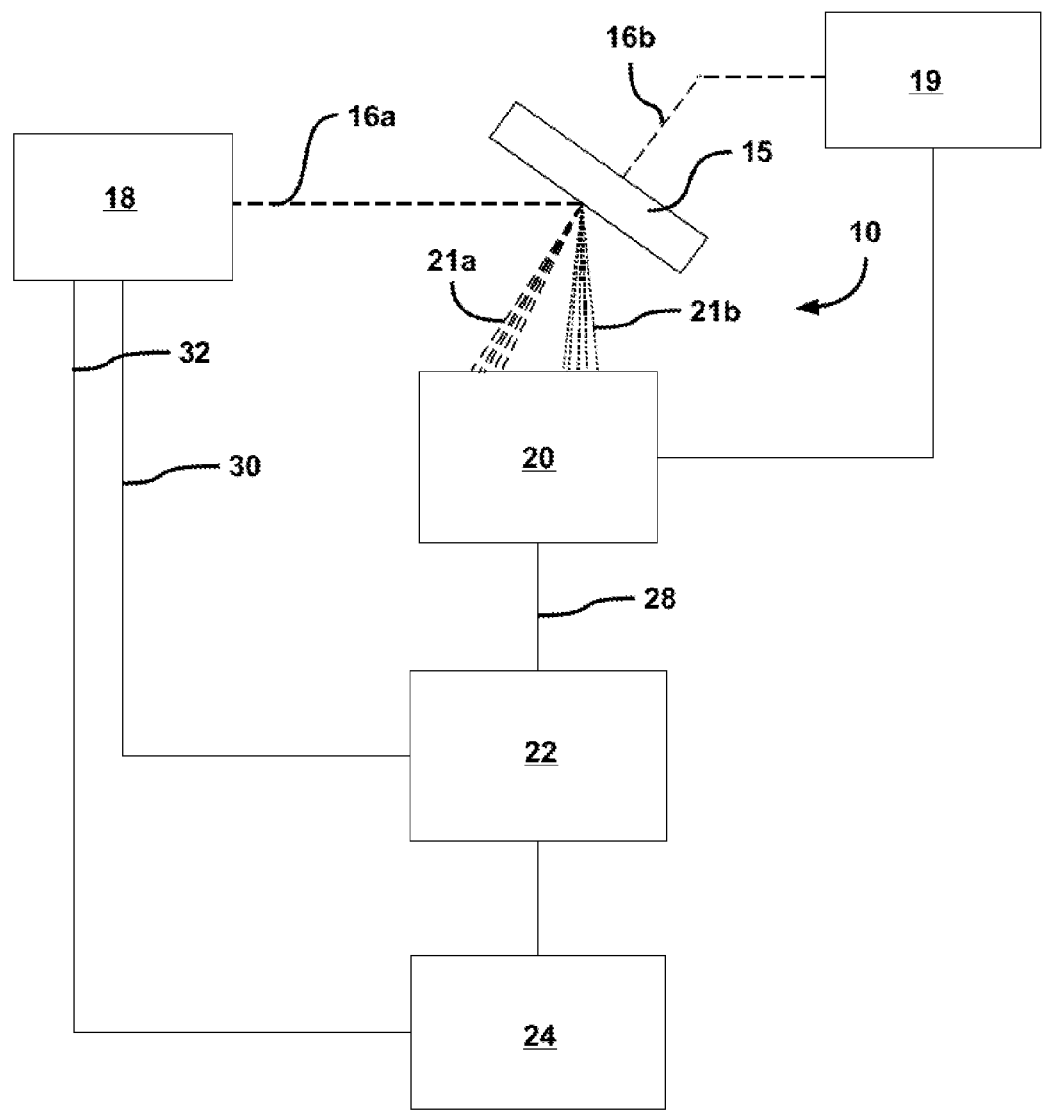
FIG. 1 is a schematic diagrammatic view of a removal system configured for removing a coating from a substrate of a component.

Referring to the drawings, wherein like reference numbers refer to like components, a removal system configured for removing a coating 12 from a substrate 14 of a component 15 using a first stream of electromagnetic radiation 16a, is shown at 10 in FIG. 1. The removal system 10 includes a first energy source 18, a sensor 20, a controller 22, and an optional display unit 24.

Figure 4:
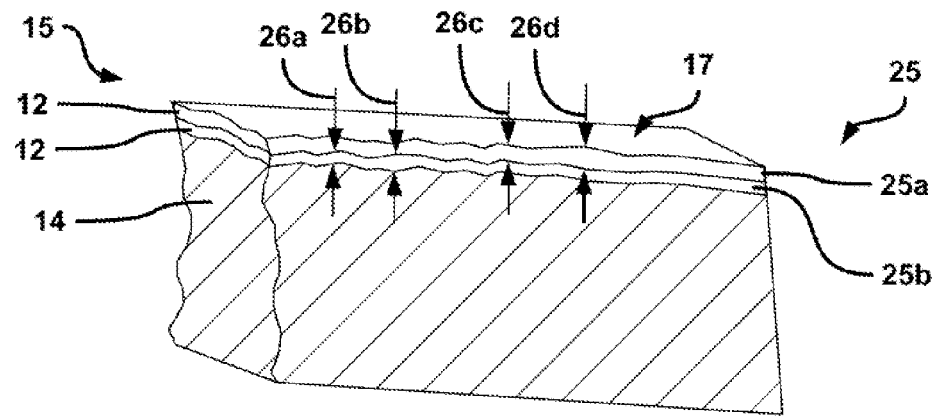
FIG. 4 is a schematic view of the component having multiple layers of coatings disposed on the substrate.

Referring to FIG. 4, the coating 12 may be one or more layers 25 of different coatings 12 disposed over one another (FIG. 4). More specifically, the layers 25 may include a first layer 25a and a second layer 25b. It should be appreciated, however, that the layers 25 may be any number of layers. The substrate 14 is an underlying material with one or more layers 25 of coating 12 disposed on the top thereof. Additionally, each layer 25 of coating 12 may have a thickness 26 which is not uniform across the substrate 14. Furthermore, each layer 25 may have thicknesses 26a, 26b, 26c, 26d which are different for each layer 25 across the substrate 14. The coating 12 may be any type of layer 25 which is attached to the substrate 14 or attached to another layer 25. The coating 12 may include, but should not be limited to, a cured film formed from a coating composition, barnacles, rust, lead, and the like. The coating composition may include, but should not be limited to, paint, primer, varnish, shellac, lacquer, and the like.

The first stream of electromagnetic radiation 16a may be may be an energy stream of heat and/or light. The first stream of electromagnetic radiation 16a may be a laser 16a. The laser 16a may be a fiber neodymium-doped yttrium aluminum garnet (Nd: YAG) laser, a CO2 laser, and the like, which are of sufficient power to remove the coating 12 from the substrate 14 of the component 15. Removal of the coating 12 may include, but should not be limited to, removal of the coating 12 using thermo mechanical stress induced dislocations, physical ablation, burning, and decomposition of the coating. Physical ablation may include the removal of the coating 12 using vaporization, chipping, and/or other erosive processes.

Referring again to FIG. 1, the sensor 20 and the first energy source 18 are operatively connected to the controller 22. The sensor 20 is a device which converts a sensed first property 21a into a numerable representation. By way of a non-limiting example, the intensity of an electromagnetic source may be represented by numbers ranging from 0 to 100. The sensor 20 may be an optical sensor 20, such as a wide-wavelength sensor 20. The sensor 20 may be a spectrum analyzer, and the like. The first energy source 18 is configured for directing the laser 16a at a power level which is based on input 32 received from the controller 22. The controller 22 is a closed loop process controller 22 which is configured for receiving input 28 from the sensor 20 and input 30 from the energy source and providing a signal or input 32 to the energy source 18 to control the power emitted by the laser 16a, based on these inputs. The sensor 20 may be integrated within a scanning head, which continually scans the component 15 to provide closed loop control of the power level of the laser 16a during the coating 12 removal process. Scanning is a systematic process by which a source of the first stream of electromagnetic radiation 16a is passed over the surface 17 of the component 15 from which the coating 12 is being removed. This process may include moving the component 15 relative to the source of first stream of electromagnetic radiation 16a, moving the source of the electromagnetic radiation 16a relative to the component 15 directing the beam of electromagnetic radiation 16a at a particular portion of the component 15, and/or providing a beam of electromagnetic radiation 16a sufficiently large to encompass the entirety of the component 15.

The laser 16a is directed to an area of the component 15 which includes the substrate 14 having the coating 12 disposed thereon. Since the coating 12 may have a variable thickness 26a, 26b, 26c, 26d over the entire substrate 14 the amount of electromagnetic radiation directed at the component 15 may need to be varied, based on the thickness 26a, 26b, 26c, 26d of the coating 12. When the laser 16a is directed at the component 15, the ablation of the coating 12 produces measurable levels of light (intensity and wavelength), with properties 34 which provide a significant indication of what material the laser 16a is impinging upon. Therefore, the sensor 20 is configured to detect a first property 21a of the coating 12 where the first stream of electromagnetic radiation 16a is being applied. The first property 21a may be in the form of a spectral visible and/or invisible radiation. The detected first property 21a, along with the power level output provided by the first energy source 18, is transmitted to the controller 22. The controller 22 analyzes the detected first property 21a and transmits the signal 32 to the first energy source 18 to continue removal of the coating 12 from the substrate 14. If the first property 21a transmitted to the controller 22 is consistent with the coating 12 having been fully removed in the area, a signal is sent to the first energy source 18 from the controller 22 to cease removal of the coating 12. This prevents the electromagnetic radiation 16a from penetrating beyond the layer 25 to be removed, and into the substrate 14 or other intermediate layers 25. This also allows enough precision to remove only the layers 25 desired, while leaving other layers 25 untouched by the laser 16a.

Figure 5:
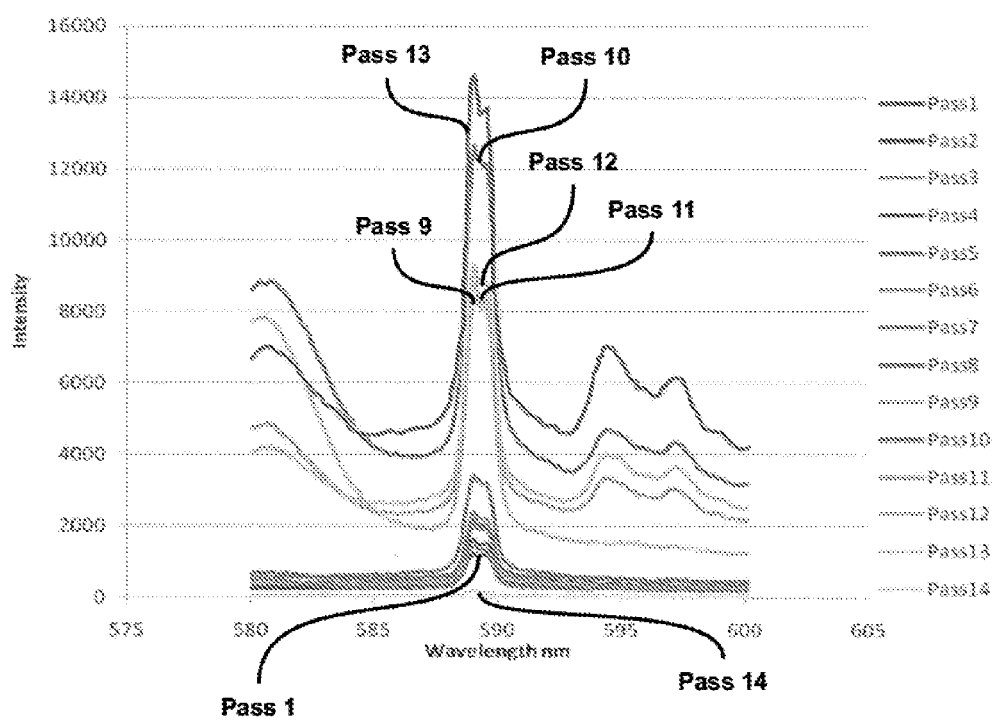
FIG. 5 is a schematic graphical illustration of the wavelength and intensity of detected by the sensor of the removal system during multiple passes of a laser across the component.

The first property 21a sensed by the sensor 20 may include any first property 21a produced by the application of the first stream of electromagnetic radiation 16a which can be measured, either in absolute terms or relative to a baseline value, include, but not limited to, power, phase angle, wavelength, and polarization state of the component 15. More specifically, one or more sensed properties 34 may be indicative of a layer 25 of a specific type of coating 12 or indicative of the substrate 14. As the sensor 20 is scanned over the component 15 and the electromagnetic radiation 16a is directed onto the layer 25, the sensor 20 measures one or more sensed properties 34, as depicted in FIG. 5. A change 36 in one or more sensed properties 34 is indicative of a difference in the surface 17 of the component 15. By way of a non-limiting example, an increased value for certain sensed properties 34 may indicate the present of a layer 25 on the substrate 14, whereas, a lack of an increased value for certain sensed properties 34 is indicative of the substrate 14. Referring specifically to the example shown in FIG. 5, a spike 36 in the light intensity is indicative of the presence of a layer 25 on the substrate 14, whereas, no spike 36 or very little spike 36 is indicative of the substrate 14. FIG. 5 further illustrates the properties 34 of the component 15 as the laser 16a is passed over the same component 15 fourteen times, i.e., Pass 1 through Pass 14. The varying peak intensities and wavelengths are indicative of different types of coatings 12 and/or the presence of only the substrate 14. By way of a non-limiting example, Pass 1 is shown as having a peak intensity of approximately 12500 at approximately 589 nm, Pass 14 is shown as having a peak intensity of approximately 250 at approximately 589 nm. The values associated with Pass 1 are equivalent to the removal of a top coat layer 25, whereas the values associated with Pass 14 are equivalent to only the presence of the substrate 14. It should be appreciated that these values may vary based on the type of coating 12, substrate 14, and/or power level provided by the first energy source 18. It should also be appreciated that the number of passes required to remove the coating may range from one to as many as desired.

The power of the laser 16a being directed to the component 15 from the power source ranges from no power to that power level necessary to achieve coating removal and in certain embodiments typically may range between 3 kW and 6 kW. More specifically, the power source may direct the laser 16a at 3 kW of power when the substrate 14 is detected by the sensor 20, in order to protect the substrate 14, and direct the laser 16a at 6 kW of power when the presence of a layer 25 is indicated, in order to remove the layer 25. Additionally, if it is desired to remove only layer 25a of the coating 12, and leave a layer 25b of a coating 12 beneath the layer 25a untouched by the laser 16a, when the sensor 20 detects the intensity associated with layer 25b, the energy source 18 may be directed by the controller 22 to reduce the power to 3 kW to prevent removal of the layer 25b by the laser 16a. It should be appreciated that other levels of power may also be used such that the layers 25 are removed and not removed from the substrate 14, as desired. The adjustment of the power of the laser 16a may be continuously adjusted based on the continued feedback the controller 22 received from the sensor 20. Therefore, more accuracy and control may be achieved through increased sampling rates of the properties 34.

Figure 2:
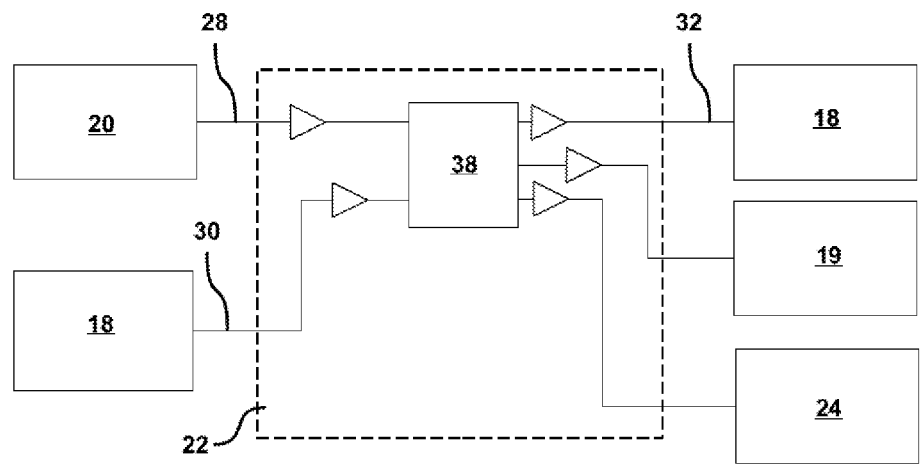
FIG. 2 is a schematic diagrammatic view of the removal system.
Figure 3:
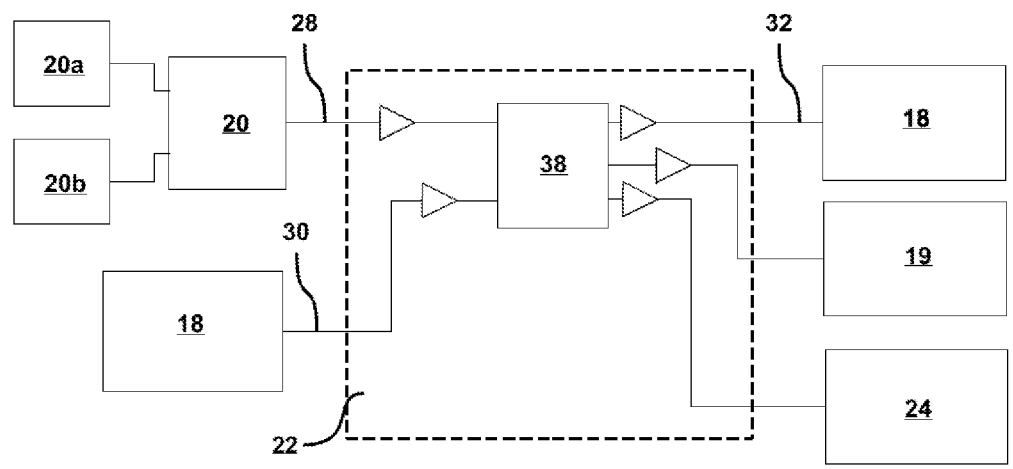
FIG. 3 is a schematic diagrammatic view of the removal system illustrating two sensors.

Additionally, referring to FIG. 2, chip-level light sensors 20 may be used, which are sensitive to a narrow range of wavelengths near a particular wavelength of interest. This sensitivity could be further refined by using an optical filter. These sensors 20a, 20b, with proper biasing, would convert the light level first property 21a into an analog voltage or current output. This analog signal would be monitored through a high speed microcontroller 38. The microcontroller 38 would provide an appropriate operator interface to enable setting of appropriate threshold levels. Then, signal levels rise above the threshold, the power of the laser 16a provided from the first energy source 18 would be raised to a maximum level, e.g., 6 kW, and when the signal levels drop below the threshold, the power of the laser 16a provided from the first energy source 18 would be dropped to the minimum level, e.g., 3 kW. Dropping the power level to the minimum level will produce significant benefits in terms of avoided substrate 14 damage. Other methods to further reduce unnecessary laser 16a application are possible, including shorted "sampling" of laser 16a pulses emitted periodically to determine the condition of the surface 17 of the component 15. Referring to FIG. 3, a plurality of sensors 20a, 20b may also be used.

The display unit 24 may be configured to provide information to the user as to the state of the removal system 10. More specifically, the display unit 24 may display the power level of the laser 16a being output from the first energy source 18, the properties 24 being sensed by the sensor, and the like.

In certain circumstances, dependent on the configuration of the type of coating 12 and substrate 14 configuration, it may be necessary to remove the laser 16a of the first energy source 18 once a selected coating 12 has been removed. In order to facilitate initiation of the selected coating removal process when an area of selected coating on the component 15 is again encountered, a second energy source 19 of stimulation may be activated. This second energy source 19 may direct a second laser 16b, which directs energy, such as a second stream of electromagnetic radiation 16b, at a second power level, different from the power level of the first energy source 18, to provide a unique wavelength to provide stimulation to detect a second property 21b. The ability to detect the second property 21b provides a distinct and detectable response difference between the selected coating 12 and the substrate 14. The sensor(s) 20 compare the responses to these coatings 12 and, when the selected coating 12 is once again encountered, the laser 16a energy of the first energy source 18 is re-initiated and the proper energy level is set in response to the sensors 20.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of removing a coating from a substrate of a component, the method comprising:
   directing a first stream of electromagnetic radiation onto the component from a first energy source;
   wherein the first energy source is energized at a first power level such that ablation caused by the first stream of electromagnetic radiation creates a first property on the component;
   directing a second stream of electromagnetic radiation onto the component from a second energy source;
   wherein the second energy source is energized at a second power level such that the second stream of electromagnetic radiation causes a second property to be produced on the component;
   detecting the first property of the component and the associated first power level of the first energy source;
   detecting the second property of the component and the associated second power level of the second energy source;
   transmitting at least one of the detected first and second properties and the associated first and second power levels to a controller;
   determining, in the controller, whether the coating is disposed on the substrate of the component, based on the detected first and second property; and
   transmitting an updated power level to at least one of the first and second energy sources in response to the determination of whether the coating is disposed on the substrate.

2. A method, as set forth in claim 1, wherein the first property produced is indicative of the removal of the coating from the substrate.

3. A method, as set forth in claim 2, wherein the second property produced is indicative of whether the coating is present on the substrate.

4. A method, as set forth in claim 3, further comprising:
   receiving an input from a sensor and a power source; and
   providing a signal to at least one of the first and second energy sources to control the emission of power in response to the input received from the sensor and the power source.

5. A method, as set forth in claim 4, wherein the sensor is one of an optical sensor and a spectrum analyzer.

6. A method, as set forth in claim 1, wherein the first and second properties include a wavelength and an intensity.

7. A method, as set forth in claim 1, wherein in response to the first power level of the first energy source being below a threshold, the second property produced on the component by the second energy source is used to set the first power level of the first energy source such that the first energy source begins ablation.

* * * * *